Patented Oct. 12, 1937

2,095,898

UNITED STATES PATENT OFFICE 2,095,898

TREATMENT OF FABRICS

William D. Wolfe, Cuyahoga Falls, Ohio, assignor to Wingfoot Corporation, Wilmington, Del., a corporation of Delaware No Drawing. Application May 4, 1934,
Serial No. 723,905

15 Claims.  (Cl. 91—68)

This invention relates to the treatment of fabrics and more particularly to the treatment of fibrous cellulose materials such as paper and cardboard to make them moisture proof. The invention includes both the method of treatment and the product obtained.

In moisture proofing a fabric according to this invention the fabric is coated with two different kinds of dopes. The first dope applied appears to act as a primer to fill the pores of the fabric and make a smooth or filled surface to which the second dope is applied.

For example in the treatment of paper or cardboard with a condensation derivative of rubber it has been found that one or several coatings of the rubber derivative give a film which is not moisture-proof. A very thick deposit of the condensation derivative of rubber is necessary to give a coating which can be considered moisture-proof. However, if the paper base is first coated with a thin film of a compound such as a partially saturated rubber hydrochloride, a thin layer of the condensation derivative of rubber upon this priming coat gives a coating which is very moisture-proof. Although the invention relates more particularly to such a primer and such a surface coating other primers and other surface coatings may be used in moisture-proofing as will appear from what follows.

Condensation derivatives of rubber may be prepared in various ways and such condensation derivatives may have somewhat different chemical formulae. Regardless of how they are prepared they are less unsaturated than rubber and in referring to them as condensation derivatives of rubber the word "condensation" is used as defined on page 245 of Cohen's "Organic Chemistry for Advanced Students" (Longman, Green & Company, N. Y., 1909): "Condensation may, then, be defined as the union of two or more organic molecules or parts of the same molecule, with or without elimination of component elements, in which the new combination is effected between carbon atoms."

A condensation derivative of rubber which appears to have the formula $(C_5H_8)_x$ may be prepared by boiling a solution of rubber in benzene for an hour or two, adding tin tetrachloride and continuing the heating and then treating with water, acetone, or alcohol. It appears that on heating the rubber solution with tin tetrachloride an intermediate product probably having the formula $(C_5H_8)_x.SnCl_4$ is formed and that on treatment with water etc. this compound is broken down and the condensation derivative of rubber obtained.

Instead of tin tetrachloride other halides of amphoteric metals such as ferric chloride, chromic chloride etc. may be employed.

A chlorine-containing condensation derivative is obtained if a solution of rubber in benzene is heated with hydrochloric acid and tin tetrachloride or other halide of an amphoteric metal, or with chlorostannic acid and the resulting product decomposed with water or the like.

In order to recover the condensation derivative when prepared in solution by any of the methods above suggested it is found advantageous to pour the solution of the reaction product obtained by the action of the tin tetrachloride or other reagent, into a large volume of water with violent agitation so as to produce an emulsion in which the solution forms the discontinuous phase. It is advantageous to add a reducing agent such as sodium sulfite to the water to prevent or minimize oxidation. By steam distilling the emulsion to volatilize the benzene or other solvent present the condensation derivative is precipitated in powdered form.

This powder may be brought into solution in any suitable solvent and used in the treatment of this invention although it is preferable to first mill the powder on a heated rubber mill and then grind the sheeted product thus formed and make the solution from the resulting powder or coarse granular or flaky product.

For example, a condensation derivative of rubber may be produced by dissolving pale crepe rubber milled to a plasticity of about 300 (as determined by a Williams plastometer) in sufficient benzene to form a 10% solution. To this is added 10% of chlorostannic acid $(H_2SnCl_6.6H_2O)$ based on the weight of the rubber. This reaction mixture is heated until the desired reaction of the chlorostannic acid on the rubber has taken place. The nature of the condensation derivative finally obtained, i. e., its softening point etc. depends upon the extent to which the chlorostannic acid reacts upon the rubber. More intensive action produces a higher melting product and a lower melting product is obtained by a less intensive reaction. A condensation derivative with a softening point in the neighborhood of about 70° C. will in general be satisfactory for the purposes of this invention, although condensation derivatives with higher or lower softening points such as, for example, 50° or 55° up to 90° or 100° C. may be used. When the reaction of the chlorostannic acid on the rubber has been carried to the desired extent (which may be determined by testing the viscosity of the reaction mixture and comparing it with the viscosity of a standard solution) the reaction is terminated by adding water or alkali. The reaction mixture is then filtered and poured into a large volume of water such as for example, 2½ gallons of water for each gallon of the reacted cement. A small amount of sodium sulfite or other reducing agent is advantageously added to the water. The reacted cement is poured into the water with violent agitation so as to produce an emulsion. This emulsion is then steam distilled and the condensation derivative thus precipitated as a powder which may be separated by filtering or centrifuging or in any other desired way. By milling the powder of the condensation derivative thus obtained on a heated rubber mill, preferably only enough to consolidate the material, e. g. by putting it through the mill several times, perhaps six times, the material so obtained is suitable for making a lacquer to be used in carrying out the invention.

A suitable primer may be prepared by milling pale crepe rubber to a plasticity of about 200 (as determined by a Williams plastometer). Twenty pounds of the milled rubber is dissolved in 313 pounds of benzene. Hydrochloric acid gas is bubbled through this solution or cement maintained preferably at a temperature of about 10° C. until 11.6 pounds of hydrochloric acid has been added. The solution is then allowed to stand until, by test, it is found that the product contains 29–30.5% of combined chlorine. The reacted cement is then steam distilled to remove excess hydrochloric acid and solvent and the product then washed on a rubber washer and dried in a vacuum. The product is a partially hydro-chlorinated rubber hydrochloride containing about 29–30.5 per cent of chlorine. This product is advantageously stabilized by adding thereto a small amount, for example several percent of a photochemical inhibitor such as: hexamethylene tetramine, dicyclohexylamine, ditetrahydrofurfuryl-amine or methylene aminoacetonitrile. A mixture such as 1% of hexamethylene tetramine and 3% of methyleneamino acetonitrile has given good results. The photochemical inhibitor may be added to the washed product and the mixture then brought into solution and employed as the primer coat. The addition of the inhibitor, however, is not necessary for the purposes hereafter set forth.

In carrying out the invention with a primer of the partially saturated rubber hydrochloride and a surface coating of the chlorine-containing condensation derivative obtained by the process described in detail above, it has been found that by the use of these two dopes as described, that is, with the rubber hydrochloride next to the base material and the condensation derivative of rubber as a surface coat over the coating of the rubber hydrochloride a very moisture-proof coating is obtained. If the order of these coats is reversed, that is, if the condensation derivative of rubber is applied to the base material and then the rubber hydrochloride is applied on top of the condensation derivative of rubber the moisture transmission is relatively high.

In tests with paper of the grade used in flour bags, using 1, 2, 3, and 4 coatings of a cement of the rubber hydrochloride varying in concentration from 2.5% of the rubber hydrochloride to 6% of the rubber hydrochloride in a solvent such as benzene or chloroform, it was found that if a heavy coating of the rubber hydrochloride was built up, for example, a coating weighing 57.3 grams per square meter, moisture transmission of about 10 or somewhat less grams per square meter in 24 hours at a temperature of 40° C. could be obtained. The control, i. e. the paper without any coating had a moisture transmission in the neighborhood of 2,000 grams per square meter in 24 hours. A single coating by which somewhat under 10 grams of the rubber hydrochloride per square meter was applied to the paper gave a moisture transmission of considerably over 100 grams per square meter in 24 hours.

Using a 5% solution of the rubber hydrochloride and spreading it on paper of the same grade, by passing the paper 24 times under a gauge that scraped the cement on the paper under tension, a film of the rubber hydrochloride weighing 24.2 grams per square meter was formed. In 24 hours this gave a moisture transmission of between 5 and 10 grams per square meter. However, such a film is quite thick for practical use and not at all suited for certain purposes.

By applying cement of a condensation derivative of rubber on the paper and then covering this with rubber hydrochloride, even using relatively thick coatings, the moisture transmission was high. However, by first applying the rubber hydrochloride and then applying the condensation derivative upon this priming coat or coats excellent moisture-proofing is obtained, even though very thin layers of each dope are applied. It was found that a film of the rubber hydrochloride about one tenth as thick as that last mentioned followed by 2–3 times its weight of the condensation derivative of rubber gave as good as or better moisture-proofing than the thick film of the rubber hydrochloride.

By adding a small amount of paraffin to each dope somewhat better moisture-proofing results were noted. For example, by first coating a highly glazed boxboard on the glazed surface with a cement containing 7.5% of the rubber hydrochloride and 0.75% of a low melting point paraffin in benzene and then after drying applying one coat of a 20% solution of a mixture of the chlorine-containing condensation derivative of rubber and 2% of the paraffin in a low boiling petroleum distillate, a moisture transmission of less than 5 grams per square meter in 24 hours was obtained. The coating of the rubber hydrochloride weighed about 8 grams per square meter and the coating of the condensation derivative of rubber weighed about 14–16 grams per square meter.

Using kraft wrapping paper and applying the dopes on a spreader machine using a scraping gauge and applying one or more coats of each dope, many tests were made and it was found that using dopes containing paraffin as above described, it was possible with a film of the rubber hydrochloride weighing less than three grams per square meter and a film of the condensation derivative of rubber weighing less than 9 grams per square meter to obtain a paper which lost about 1½ or less grams of water per square meter in 24 hours. The control, i. e. the kraft wrapping paper without any coating had a moisture transmission of about 800 grams per square meter in 24 hours.

The rubber hydrochloride dope or cement employed was quite viscous and much more so than the cement of the condensation derivative of rubber. Cement containing about 6 or 7% of the rubber hydrochloride is as viscous as a cement of 30% of the condensation derivative of rubber. It appears that the viscous cement does not penetrate into the fabric the way that the much less viscous cement of the condensation derivative does without the priming coat. The priming coat appears to fill the pores or openings in the fabric and thus give a surface to which a small amount of the condensation derivative of rubber can be applied without any substantial penetration of the fabric. However, with a fabric such as kraft paper and the other fabrics tested the coating of the primer gives sufficient penetration to adhere strongly to the base material.

Although the invention has been described more particularly as applied to the use of rubber hydrochloride and a condensation derivative of rubber on fabric base materials it is to be understood that the invention is not limited to the examples above given. Either chlorine-containing condensation derivatives of rubber or hydrocarbon condensation derivative of rubber may be used. Various papers containing different amounts of sizing, glazed or unglazed, may be so treated. Other fabrics such as cotton fibers, and cloth products such as duck, and fibers and cloths of other materials than cotton such as silk, etc. may be water-proofed as described.

Instead of using rubber hydrochloride as the primer a rubber cement preferably an unmilled or a partially milled rubber brought into solution in a suitable solvent has been used and found to give lower transmission than the same total weight of rubber or the same total weight of the condensation derivative employed alone. In other words a lighter coating comprising both materials, with the rubber cement applied to the base, is to be preferred to either material alone as a moisture-proofing agent.

Instead of rubber or rubber hydrochloride another rubber derivative such as a chlorinated rubber or other viscous primer may be used.

As the surface coating other condensation products than condensation derivatives of rubber have been employed with satisfactory results. Both bakelite and glyptal (such as glycerine-phthalic acid condensation product) dopes were used. Such water-proofing condensation products, although quite moisture proof on a suitable backing require a coating of considerable thickness on a fibrous fabric such as paper, cardboard, pasteboard, cotton duck, etc. if used alone. By first applying a viscous priming dope even where only a thin coating of the dope is used, a thin coating of the condensation product in conjunction therewith gives good moisture-proofing.

The test for moisture transmission used in all of the experiments referred to herein consisted in determining the transmission of the water through a given area of the coated base material in 24 hours in a dehydrator maintained at 40° C. and containing concentrated sulfuric acid. In order to test the moisture transmission through paper the paper is sealed over a straight walled crystallizing dish containing a weighed amount of water. This is placed in the dehydrator, where by artificial circulation of the air over the crystallizing dish and the sulfuric acid, the water which evaporates and passes through the paper is absorbed in the acid. The loss in weight in the water in the crystallizing dish after 24 hours serves as the basis for calculating the amount of water which would pass through a square meter under the given conditions.

What I claim is:

1. A highly moisture-proof packaging material comprising a fibrous cellulosic base, said base being primed with a thin priming coat composed largely of a partially hydrochlorinated rubber hydrochloride having a chlorine content of about 29–30.5 percent, and attached to said priming coat a thin coating composed largely of a condensation derivative of rubber obtainable by reacting rubber with the halide of an amphoteric metal and decomposing the resulting product with water.

2. A highly moisture-proof packaging material comprising a base of paper in sheet form, a thin coating of a partially hydrochlorinated rubber hydrochloride having a chlorine content of about 29–30.5 percent forming a thin continuous coat on said base, and on said coating of rubber hydrochloride a thin coating of a chlorine-containing condensation derivative of rubber obtainable by reacting rubber in solution with chlorostannic acid and decomposing the resulting product with water.

3. A highly moisture-proof packaging material comprising a base of fibrous cellulosic material, a thin moisture-proof surface coating composed of a condensation derivative of rubber obtainable by decomposing with water the reaction product of a rubber solution and a condensing agent from the class consisting of halides of amphoteric metals and chlorostannic acid and disposed between said base and moisture-proof coating and penetrating the pores of said base a thin continuous coating of a rubber hydrochloride.

4. A highly moisture-proof wrapping or packaging material comprising a sheet of fabricated fibrous cellulosic material, a thin moisture-proof surface coating of a condensation derivative of rubber obtainable by decomposing with water the reaction product of a rubber solution and a condensing agent from the class consisting of halides of amphoteric metals and chlorostannic acid, and disposed between said sheet and surface coating and penetrating the pores of said sheet a thin continuous coating of a hydrochlorinated rubber.

5. A highly moisture-proof wrapping or packaging material comprising a sheet of fabricated fibrous cellulosic material, a thin moisture-proof surface coating of a condensation derivative of rubber, obtainable by reacting rubber with tin tetrachloride and decomposing the resulting product with water, and disposed between said sheet and surface coating and penetrating the pores of said sheet a thin continuous coating of a rubber hydrochloride.

6. A highly moisture-proof packaging material comprising a thin sheet of fibrous cellulosic material, a thin surface coating of a condensation derivative of rubber obtainable by reacting rubber with tin tetrachloride and decomposing the resulting product with water, and disposed between said sheet and said surface coating and penetrating the pores of said sheet a thin continuous coating of a partially hydrochlorinated rubber hydrochloride.

7. The method of preparing a highly moisture-proof packaging material which comprises priming a thin sheet of fabricated fibrous cellulosic material with a viscous priming coat of a partially hydrochlorinated rubber hydrochloride having a chlorine content of about 29–30.5 percent and applying thereto a thin coating of a composition comprising a condensation derivative of rubber obtainable by decomposing with water the reaction product of a rubber solution and a condensing agent from the class consisting of halides of amphoteric metals and chlorostannic acid.

8. The method of preparing a highly moisture-proof packaging material which comprises priming a thin sheet of fabricated fibrous cellulosic material with a viscous priming coat of a partially hydrochlorinated rubber hydrochloride having a chlorine content of about 29-30.5 percent and applying thereto a thin coating of a composition comprising a condensation derivative of rubber obtainable by reacting rubber with the halide of an amphoteric metal and decomposing the resulting product with water.

9. In a method of moisture-proofing, the steps which comprise applying to a base of fabricated fibrous cellulosic material a viscous priming rubber hydrochloride composition which penetrates the pores of said base and forms a thin uniform coating on said base, and applying to said thin uniform coating a thin coating of a moisture-proofing agent which comprises a condensation derivative of rubber obtainable by decomposing with water the reaction product of a rubber solution and a condensing agent from the class consisting of halides of amphoteric metals and chlorostannic acid.

10. In a method of moisture-proofing, the steps which comprise applying to a fibrous cellulosic sheet a partially saturated rubber hydrochloride which penetrates the pores of said sheet and forms a thin uniform coating on said sheet, and applying to said thin uniform coating a thin coating of a condensation derivative of rubber obtainable by reacting rubber with tin tetrachloride and decomposing the resulting product with water.

11. A highly moisture-proof packaging material comprising a fibrous cellulosic sheet, a thin surface coating of a composition consisting of a minor portion of a waxy substance and a major portion of a condensation derivative of rubber obtainable by reacting rubber with tin tetrachloride and decomposing the resulting product with water, and disposed between said sheet and said surface coating and penetrating the pores of such sheet a thin coating of a partially saturated rubber hydrochloride.

12. A highly moisture-proof packaging material which comprises a fibrous cellulosic base, said base being primed with a thin priming coat composed largely of a rubber derivative containing at least 29% halogen of addition, and overlying said priming coat a thin coating composed largely of a condensation derivative of rubber obtainable by decomposing with water the reaction product of a rubber solution and a condensing agent from the class consisting of halides of amphoteric metals and chlorostannic acid.

13. The method of preparing a highly moisture-proof packaging material which comprises applying to a fibrous cellulosic base a solution of a rubber derivative containing at least 29% halogen of addition to form a continuous flexible film substantially impervious to moisture and applying to said film a thin coating of an unoxidized condensation derivative of rubber in a petroleum solvent, which condensation derivative is obtainable by decomposing with water the reaction product of a rubber solution and a condensing agent from the class consisting of halides of amphoteric metals and chlorostannic acid.

14. The method of moisture-proofing a fibrous cellulosic base which comprises applying thereto a priming coat composed in substantial part of a material from the class consisting of rubber and rubber derivatives which contain at least 29% of chlorine of addition and then applying to the primed base a coating which contains a substantial part of a condensation derivative of rubber obtainable by decomposing with water the reaction product of a rubber solution and a condensing agent from the class consisting of halides of amphoteric metals and chlorostannic acid.

15. A highly moisture-proof packaging material which comprises a fibrous cellulosic base primed with a material from the class consisting of rubber and rubber derivatives which contain at least 29% of halogen of addition, overlying the same a coating composed in substantial part of a condensation derivative of rubber obtainable by decomposing with water the reaction product of a rubber solution and a condensing agent from the class consisting of halides of amphoteric metals and chlorostannic acid.

WILLIAM D. WOLFE.